United States Patent
Kerszykowski et al.

[11] Patent Number: 5,969,972
[45] Date of Patent: Oct. 19, 1999

[54] METHOD FOR MANUFACTURING A SEMICONDUCTOR COMPONENT AND AUTOMATIC MACHINE PROGRAM GENERATOR THEREFOR

[75] Inventors: David Kerszykowski, Chandler; Warren F. Higgins, Gilbert; Jerry A. Toogood, Higley; Robert C. Turner, Mesa, all of Ariz.

[73] Assignee: Motorola, Inc., Schaumburg, Ill.

[21] Appl. No.: 08/886,747

[22] Filed: Jul. 2, 1997

[51] Int. Cl.$^6$ .............................. G06F 19/00; G06G 7/66
[52] U.S. Cl. ................. 364/468.28; 364/468.24; 364/474.01; 364/474.02; 364/474.21
[58] Field of Search ............... 364/468.28, 474.01, 364/468.24, 474.21, 474.02; 395/651, 652; 505/300; 437/939

[56] References Cited

U.S. PATENT DOCUMENTS

| | | | |
|---|---|---|---|
| 5,243,377 | 9/1993 | Umatate et al. | 355/53 |
| 5,338,630 | 8/1994 | Yoon et al. | 430/30 |
| 5,544,046 | 8/1996 | Niwa | 364/474.01 |
| 5,663,076 | 9/1997 | Rostoker et al. | 364/468.28 |

OTHER PUBLICATIONS

Sullivan et al, A control–to–target architecture for process control, IEEE Transactions on Semiconductor Manufacturintg, vol. 7 No. 2, pp. 134–148, May 1994.

Leang et al, Application of feed–forward control to a lithography stepper, 1992 IEEE/SEMI Int'l Semiconductor Manufacturing Science Symposium, pp. 79–84, 1992.

Leang et al, Applicatiion of feed–forward and feedback control to a photolithography sequence, 1992 IEEE/SEMI Int'l Semiconductor Manufacturing Science Symposium, pp. 143–147, 1992.

*Primary Examiner*—William Grant
*Assistant Examiner*—McDieund Marc
*Attorney, Agent, or Firm*—Rennie W. Dover

[57] ABSTRACT

An automated machine program generator (10) and a method for optimizing the manufacture of articles. The automated machine program generator (10) includes a data repository editor (11), a table parameter editor (13), and an optimizer editor (14). The data repository editor (11) collects data from various sources. The data is transformed and placed in a table (12). If necessary, the data in the table (12) is modified by the table parameter editor (13). The modified data is optimized by the optimizer editor (14) and transferred to a piece of equipment (15) for manufacturing the article.

17 Claims, 3 Drawing Sheets

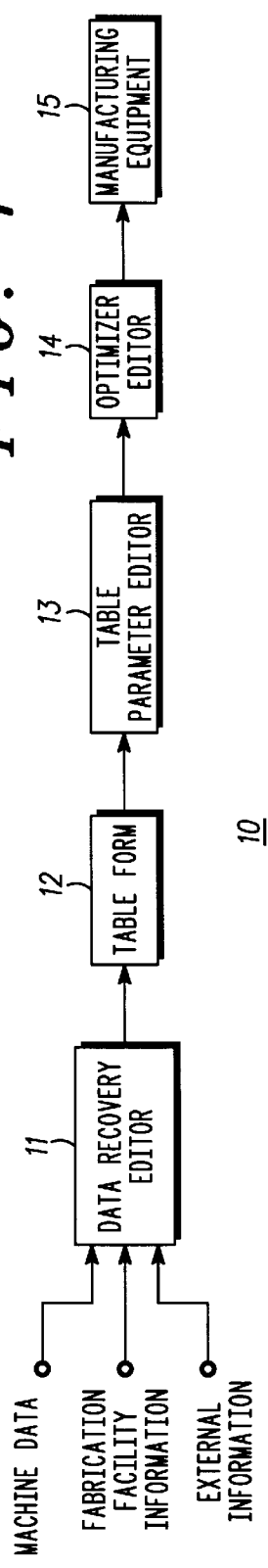
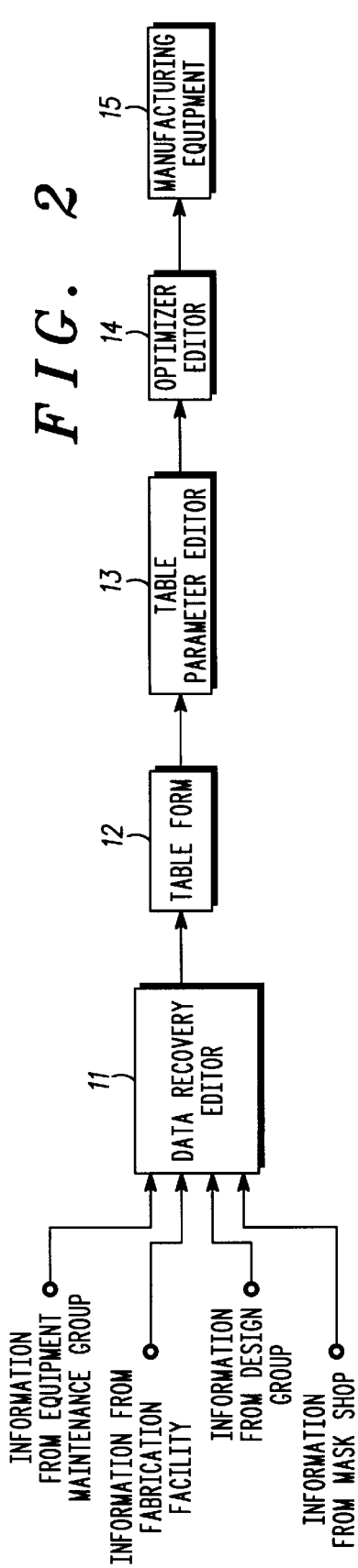
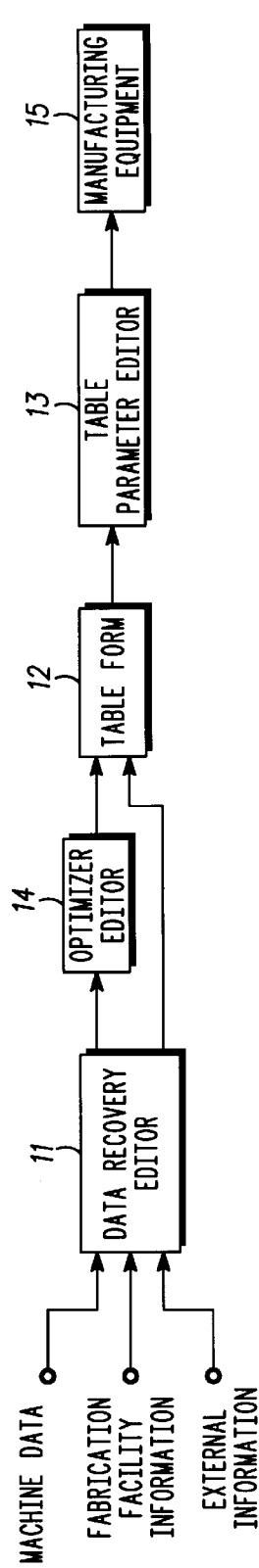

FIG. 4

| | SAMPLE | | | | | | | |
|---|---|---|---|---|---|---|---|---|
| FILE NAME | T12AP0100 | P0000 | P0100 | P0500 | P0600 | P04N00 | P04P00 | P0800 |
| PRODUCT GROUP | GROUP # | T12BP0000 | T12BP0100 | T12BP0500 | T12BP0600 | T12BP04N00 | T12BP04P00 | T12BP080 |
| TECHNOLOGY | FLOW # | GROUP A | GROUP B | GROUP C | GROUP D | GROUP E | GROUP F | GROUP G |
| SHRINK SIZE | 80 | FLOW 1 | FLOW 2 | FLOW 3 | FLOW 4 | FLOW 5 | FLOW 6 | FLOW 7 |
| DATE CREATED | 26_APR_1999 | 23_OCT_199_ | 23_OCT_199_ | 23_OCT_199_ | 23_OCT-199_ | 23_OCT_199_ | 23_OCT_199_ | 23_OCT_ |
| LOAD LAYOUT FILE NAME | BASEA | BASEA | BASEA | BASEA | BASEA | BASEA | BASEA | BASEA |
| DSP COMMENTS COMMENT | T12A | T12B | T12B | T12B | T12B | T12B | T12B | T12B |

PARMS
LAYERS P0100 TO
DATE_CREATED 23_OCT_1996

TABLE [ADD LAYER COLUMN]
TABLE EDIT [LAYER COLUMN]

[SAVE/CLOSE] [SAVE/VERIFY] [CLOSE] [HELP]

METHOD FOR MANUFACTURING A SEMICONDUCTOR COMPONENT AND AUTOMATIC MACHINE PROGRAM GENERATOR THEREFOR

BACKGROUND OF THE INVENTION

The present invention relates, in general, to manufacturing optimization and, more particularly, to optimizing the manufacture of electronic components.

The manufacture of electronic components such as semiconductors requires many process steps and many different types of equipment. Each step and type of equipment introduces variation into the manufacturing process that decreases the yield of the semiconductor devices. For example, a first processing step may include a photolithographic step that is performed in a piece of equipment manufactured by one manufacturer. A subsequent processing step may include a photolithographic step that is performed in a piece of equipment that is manufactured by another manufacturer. Another processing step may require another piece of photolithographic equipment that is manufactured by the same or different manufacturers as the first two pieces of photolithographic equipment. Each of these pieces of photolithographic equipment have different tolerances that are typically unaccounted for in the manufacture of products such as semiconductor components.

Accordingly, it would be advantageous to have a method and a structure capable of allowing the fabrication of these devices without introducing large errors between different pieces of equipment. It would be of further advantage for the method to be portable, user friendly, and capable of improving cycle times as well as yields.

BRIEF DESCRIPTION OF THE DRAWINGS

FIG. 1 is a simplified illustration of an automated machine program generator in accordance with an embodiment of the present invention;

FIG. 2 is a simplified illustration of an automated machine program generator for manufacturing a semiconductor component in accordance with the present invention;

FIG. 3 is a simplified illustration of an automated machine program generator in accordance with another embodiment of the present invention;

FIG. 4 is a table for use with the automated machine program generator of FIG. 2;

DETAILED DESCRIPTION OF THE DRAWINGS

Figure 5:
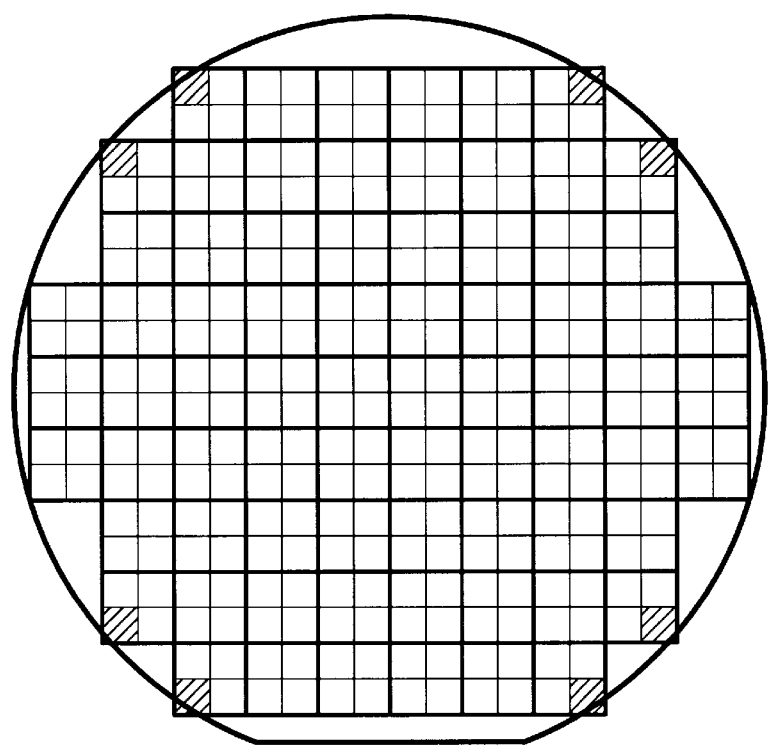
FIG. 5 is a top view of a shot map generated by a prior art shot map generator.

Generally, the present invention provides a method and an apparatus for optimizing the performance of manufacturing equipment or tools. More particularly, the present invention provides an automated machine program generator having a data repository editor, a table parameter editor, and an optimizer editor. The optimizer editor is also referred to as an optimization editor or an optimizer. Tools or machinery compatible for use with the automated program generator of the present invention include semiconductor processing equipment such as photolithography tools, e.g., steppers and contact printers, probe tools, tools that scribe semiconductor wafers, tools that break semiconductor wafers, metrology tools, etch equipment, chem-mechanical polishing equipment, ion implanters, sputtering equipment, furnaces, etc.

FIG. 1 is a simplified illustration of an automated machine program generator 10 in accordance with an embodiment of the present invention. Program generator 10 includes a data repository editor 11 in which machine data, fabrication facility information, and external information is collected. The information from data repository 11 is translated into machine usable data. Translation of the data is also referred to as transforming or reformatting the data, thereby creating transformed or reformatted data. In other words, the information from data repository editor 11 is transformed and placed in table form for use by a table parameter editor 13, which permits visual verification and modification of the data within an editable table 12. In addition, program generator 10 includes an optimizer editor 14 for optimizing product parameters. The machine usable information or data from table 12 and optimizer editor 14 is transferred or transported to a tool or piece of equipment 15 for manufacturing a product. As described hereinbefore suitable tools include photolithography tools, probe tools, scribe tools, break tools, metrology tools, etching equipment, polishing equipment, and doping equipment.

By way of example, program generator 10 is used in conjunction with semiconductor photolithography equipment 16 to manufacture semiconductor components or devices. FIG. 2 illustrates that in this example, data repository editor 11 receives manufacturing information or data from four data sources: (a) the equipment maintenance group; (b) the fabrication facility; (c) the design group; and (d) the mask shop. The equipment maintenance group provides current information about the photolithography equipment such as the type of equipment being used and any communications protocols used for transporting information between the various pieces of equipment. The fabrication facility provides fabrication information such as exposure times, doses, lens size, etc. The design group supplies information from designers such as information about the reticles, and the mask shop provides information such as the clear-to-chrome ratios and offset errors.

Use of data repository 11 allows for the interactive processing of the information from the fabrication facility and the equipment maintenance group. Further, data repository 11 permits automatic incorporation of reticle information, mask shop centering errors, machine offsets, and the incorporation of physical design information in calculating equipment characteristics when the program for controlling the photolithography equipment is generated. Thus, distributed information is collected, downloaded, and transferred to a targeted machine. It should be noted that the number of sources of information for data repository 11 is not limited to four, i.e., there may be more or less than four sources of information.

FIG. 3 is a simplified illustration of an automated machine program generator 20 in accordance with another embodiment of the present invention. Program generator 20 includes a data repository editor 11 in which machine data, fabrication facility information, and external information is collected. The information from data repository editor 11 is transferred to optimizer editor 14 for optimizing product parameters. In addition, the information from data repository editor 11 is transformed and placed in table form, i.e., placed in table 12. The information in table 12 is operated on by table parameter editor 13. The information from table parameter editor 13 is transferred to tool 15 for manufacturing a product. It should be noted that the difference between the embodiments of FIGS. 2 and 3 is the order in which the sequence of steps is performed.

Now referring to FIG. 4, an example of a table 12 that is operated on by table parameter editor 13 is illustrated. Table parameter editor 13 allows visual, i.e., manual, verification of the data present therein. In accordance with the example of FIG. 2, i.e., the tool being photolithographic equipment, table 12 includes information about each mask layer used to manufacture a particular semiconductor device. As those skilled in the art are aware, semiconductor devices are manufactured using a plurality of photomasking steps that expose different areas of a semiconductor wafer. The exposed areas then undergo various processing steps such as oxidation, implantation, etching, or other process steps known to those skilled in the art. More particularly, table 12 contains information used to form each photomask. By way of example, the photomasks are labeled "P0000," "P0100, " "P0500," "P0600," "P04N00," "P04P00," and "P0800." Each of these photomasks defines a different pattern for manufacturing a transistor labeled "T12A" followed by the photomask identifier. In other words, the first photomask is used to generate the first pattern on a semiconductor wafer and is labeled as mask "T12P0000." All the attributes for a particular photomask are entered in a single column labeled "P00000".

Information included in each cell includes the name of the product group (Product Group) that owns the particular device type, e.g., Group A, Group B, etc.; the type of technology (Technology Type) or process flow used to manufacture the device, e.g., a two-layer metal flow, a three-level metal flow, etc.; the shrink size of the device, e.g., 87 percent (%), 85%, 70%, etc.; the exposure settings for a particular device; the focus settings for a particular device; the alignment key locations for a particular device, etc. It should be noted that a cell is identified by specified row and column locations for entries within table 12. All the cells of table 12 are uniquely defined in two ways: (a) the types of information that can be entered into each cell, e.g., numeric and/or alphabetic; and (b) the range of each cell, i.e., a range file that specifies the lower and upper limits of the file.

Preferably, for each field there is a rule or rule file that sets out the format of the device name and device nomenclature as well as the layer nomenclature. For example, for a field effect transistor (FET) having a width-to-length (W/L) ratio of twelve, the transistor nomenclature may be "T12A". Similarly, for a layer manufactured using seven masking steps, the layer nomenclature may be "P0000," "P0100," "P0500," "P0600," "P07N00," "P07P00," and "P0800," where the letter appearing after the number "7" represents N and P channel FETs. Thus, as described hereinbefore, the complete label of each mask for the transistor is given by "T12AP0000," "T12AP0500," etc. Likewise, rules exist for describing, for example, the shrink size, the exposure settings, the focal settings, the alignment key locations, etc. These rules set the guidelines for making edits to a particular field or location within table 12.

Further, the use of rules files in accordance with the present invention permits smart edits. In other words, the user can perform operations such as copy and paste in a smart fashion, e.g., "drag and drop" operations can be performed. Likewise, a particular field for a group of devices may be simultaneously changed using a single keystroke. For example, the first layer for many different devices may be simultaneously changed using a single keystroke. Moreover, because these rules are user-defined, additional fields can be added that refer to particular locations within table 12 and allow modification or change of the parameters at these locations. Thus, changes to table 13 can be specific to a particular field or data file or generic to all fields or data files. Therefore, table parameter editor 13 permits generating a customer configurable run control file for manufacturing a semiconductor component using a single keystroke. In addition, table parameter editor 13 enables performing an observable debug operation over a user defined range of the run control file. In other words, the user has the ability to scan table 12 with the "naked eye" to observe any errors and to subsequently use table parameter editor 13 to correct any errors that are observed or found. To increase the portability of the present invention, a bridge-translation program may be used to generate the run control file to allow different programs to interact with each other. Changes to table 12 are implemented at table load time.

Referring again to FIG. 4, the data from table parameter editor 13 is operated on by optimizer editor 14. Optimizer editor 14 provides a means for graphically interacting with a user to interactively optimize the number of exposures used in the photolithography equipment as well as the location of each exposure, i.e., the shot map, for the photolithography equipment. Optimizer editor 14 may use surface trend analysis on data such as reformatted data for optimization of the reformatted data. In addition, optimizer editor 14 is capable of supporting multiple reticle and stepper types. By way of example, optimizer editor 14 optimizes shot maps for a plurality of stepper types used to manufacture a single product. As those skilled in the art are aware, a shot map refers to the orientation of the exposure pattern in a piece of photolithography equipment.

Figure 6:
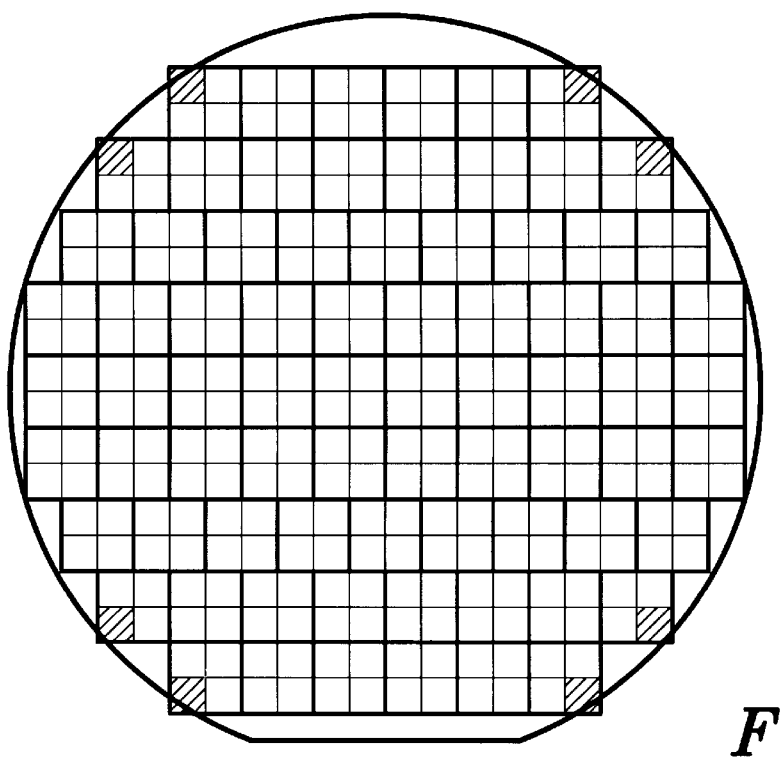
FIG. 6 is a top view of a shot map generated by the automated machine program generator of FIG. 2.

Briefly referring to FIG. 5, an exposure pattern of a non-optimized shot map is illustrated. By way of example, the exposure pattern generates 288 good die or chips. Now referring to FIG. 6, an exposure pattern of a shot map optimized in accordance with the present invention is illustrated. Thus, optimizer editor 14 of the present invention permits shifting the shot pattern, i.e., a selected parameter, to increase or preferably optimize the yield of semiconductor chips per semiconductor wafer.

By now it should be appreciated that an apparatus and a method have been provided for optimizing product manufacturing and automating run control files for equipment used in manufacturing articles such as semiconductor components. The apparatus includes a data repository editor which is capable of collecting data from a plurality of sources. The data repository editor allows interactive input of data from the plurality of sources so that product is manufactured using the most current information. Similarly, the table parameter editor permits editing the data collected by the data repository editor. The data is then optimized by the optimizer editor for use in manufacturing products. The present invention permits production of products such as semiconductor devices using the most up to date information in both time and cost efficient manners.

We claim:

1. A method for controlling semiconductor manufacturing equipment, comprising the steps of:

generating a run control file for a semiconductor component by using a bridge-translation program, wherein the bridge-translation program allows different programs to interact with each other, wherein the run control file is generated by a single keystroke;

downloading the run control file to the semiconductor manufacturing equipment; and operating the semiconductor manufacturing equipment in accordance with the run control file that has been downloaded to manufacture a semiconductor component.

2. The method of claim 1, wherein the step of generating a run control file includes providing manufacturing data in an editable table.

3. The method of claim 1, wherein the step of downloading the run control file to the semiconductor manufacturing equipment includes downloading the machine usable data to a tool selected from the group consisting of photolithography tools, probe tools, scribe tools, break tools, metrology tools, etching equipment, polishing equipment, and doping equipment.

4. The method of claim 3, wherein the step of downloading machine usable data to a tool selected from the group consisting of photolithography tools, probe tools, scribe tools, break tools, metrology tools, etching equipment, polishing equipment, and doping equipment includes using photolithography tools selected from the group consisting of steppers and contact printers.

5. The method of claim 4, wherein the step of downloading machine usable data to a tool includes a step of shifting a pattern of the machine usable data to optimize a selected parameter.

6. The method of claim 5, wherein the step of shifting a pattern of the machine usable data includes shifting the pattern to optimize a number of semiconductor chips per semiconductor wafer.

7. The method of claim 1, wherein the step of generating a run control file includes providing data from at least one data source selected from the group of data sources consisting of equipment information, fabrication information, and external information.

8. The method of claim 7, further including providing the external information from at least one of a designer or a mask shop.

9. The method of claim 1, further including the step of performing an observable debug operation.

10. The method of claim 9, wherein the step of performing the observable debug operation includes performing the observable debug operation over a user defined range of the run control file.

11. The method of claim 1, wherein the step of generating the run control file includes generating a customer configurable run control file.

12. A method for automating run control files for equipment used in manufacturing a semiconductor component, comprising the steps of:

generating a run control file for a semiconductor component by using a bridge-translation program, wherein the bridge-translation program allows different programs to interact with each other, and wherein the run control file is generated by a single keystroke that provides a parameter change to at least one data file;

reformatting data in the run control file for use in a specified machine, thereby creating reformatted data;

downloading the reformatted data to the specified machine; and using the reformatted data to fabricate the semiconductor component.

13. The method of claim 12, wherein the step of generating a run control file includes uniquely collecting data from a fabrication facility, an equipment maintenance group, a designer, and a mask shop.

14. The method of claim 12, wherein the step of generating a run control file includes collecting machine offset data.

15. The method of claim 12, further including using a stepper as the specified machine.

16. The method of claim 12, further including the step of performing surface trend analysis on the reformatted data.

17. The method of claim 12, further including interactively adjusting a wafer map parameter.

* * * * *